(12) United States Patent
Cai et al.

(10) Patent No.: US 7,529,833 B2
(45) Date of Patent: May 5, 2009

(54) METHOD, SYSTEM, AND WEB SERVICE BROKER FOR DYNAMIC WEB SERVICE INVOCATION

(75) Inventors: Jun Jie Cai, Shanghai (CN); Chun Jie Tong, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 11/438,546

(22) Filed: May 22, 2006

(65) Prior Publication Data

US 2006/0265720 A1    Nov. 23, 2006

(30) Foreign Application Priority Data

May 23, 2005    (CN)    ......................... 2005 1 0072187

(51) Int. Cl.
*G06F 15/173*    (2006.01)
(52) U.S. Cl. ...................................... 709/225; 709/226
(58) Field of Classification Search ................. 709/228, 709/225, 226
See application file for complete search history.

(56) References Cited

U.S. PATENT DOCUMENTS

| | | | |
|---|---|---|---|
| 7,324,969 B2* | 1/2008 | Pallister et al. ................. 705/37 |
| 7,440,940 B2* | 10/2008 | Chen et al. ...................... 707/4 |
| 2003/0055624 A1* | 3/2003 | Fletcher et al. ................. 704/2 |
| 2003/0204622 A1* | 10/2003 | Blizniak et al. ............. 709/241 |
| 2004/0054690 A1* | 3/2004 | Hillerbrand et al. ...... 707/104.1 |
| 2004/0064428 A1* | 4/2004 | Larkin et al. .................... 707/1 |
| 2004/0068586 A1* | 4/2004 | Xie et al. ...................... 709/246 |
| 2004/0111525 A1* | 6/2004 | Berkland et al. ............ 709/231 |
| 2005/0144277 A1* | 6/2005 | Flurry et al. ................. 709/225 |
| 2006/0004764 A1* | 1/2006 | Kurhekar et al. .............. 707/10 |
| 2006/0053120 A1* | 3/2006 | Shum et al. .................. 707/100 |

OTHER PUBLICATIONS

Degwekar, S. Su, S.Y.W. Lam, H. "Constraint specification and processing in Web services publication and discovery," Jul. 9, 2004, IEEE International Conference on Web Services, 2004. Proceedings, pp. 210-217.*

* cited by examiner

*Primary Examiner*—James Trujillo
*Assistant Examiner*—Marc Somers
(74) *Attorney, Agent, or Firm*—Kenneth R. Corsello; Anne Vachon Dougherty (57) ABSTRACT

A method, system and Web service broker with requester's explicit control for dynamic Web service invocation. In accordance with the method a Web service request is constructed by a Web service requester, in which invocation criteria customized by the requester are included and the Web service request is sent to a Web service broker. The Web service broker discovers and invokes Web service implementation candidates that meet the invocation criteria based on the Web service request and returns the best invocation result as well as a session identifier for identifying this service request to the requester. The requester can explicitly control the process of Web service invocations through customized Web service requests, thus delegating the whole invocation process to a Web services broker to reduce the complexity of client-side tasks. In addition, the Web service invocation allows a series of invocations with a consistent business sense to be directed to the same Web service interface.

3 Claims, 6 Drawing Sheets

```
<?xml version="1.0" encoding="UTF-8"?>
<soapenv:Envelope xmlns:soapenv="http://schemas.xmlsoap.org/soap/envelope/"
        xmlns:soapenc="http://schemas.xmlsoap.org/soap/encoding/" xmlns:xsd="http://
www.w3.org/2001/XMLSchema"
        xmlns:xsi="http://www.w3.org/2001/XMLSchema-instance">
<soapenv:Header>

301
        <vshsl:request allowMultiple="true" xmlns:vshsl="http://www.vshsl.org/v1">
                                                                    303
        <vshsl:discovery>
            <vshsl:discoveryRule mechanism="UDDI">
    302         <portType>BookStorePT</portType>
                <targetNamespace>http://some-uri/bookstore/</targetNamespace>
            </vshsl:discoveryRule>
        </vshsl:discovery>
                                                    305
        <vshsl:comparison>
            <vshsl:comparisonRule format="SOAP">
                <vshsl:property name="//deliveryDate"
                    operator="lessThan"
    304             dataType="date"
                    constant="2006-05-01">
                <vshsl:property name="//price"
                    operator="minimize"
                    dataType="double">
                                                        306
            </vshsl:comparisonRule>
        </vshsl:comparison>

</vshsl:request>

</soapenv:Header>

<soapenv:Body>
    <queryBook xmlns="http://some-uri/bookstore">
        <bookName>Web Services Roadmap</bookName>
    </queryBook>
</soapenv:Body>
</soapenv:Envelope>
```

Fig. 3

```
<?xml version="1.0" encoding="UTF-8"?>
<soapenv:Envelope xmlns:soapenv="http://schemas.xmlsoap.org/soap/envelope/"
        xmlns:soapenc="http://schemas.xmlsoap.org/soap/encoding/"
        xmlns:xsd="http://www.w3.org/2001/XMLSchema"
        xmlns:xsi="http://www.w3.org/2001/XMLSchema-instance">
    <soapenv:Header>
        <wshsl:request allowMultiple="false" sessionId="34w-5366408AZ"
                xmlns:wshsl="http://www.wshsl.org/v1" />
    </soapenv:Header>
    <soapenv:Body>
        <orderBook xmlns="http://some-uri/bookstore">
            <bookName>Web Services Roadmap</bookName>
        </orderBook>
    </soapenv:Body>
</soapenv:Envelope>
```

METHOD, SYSTEM, AND WEB SERVICE BROKER FOR DYNAMIC WEB SERVICE INVOCATION

FIELD OF THE INVENTION

The present invention relates generally to Internet techniques, and more specifically, to the dynamic invocation of Web services.

BACKGROUND OF THE INVENTION

Figure 1:
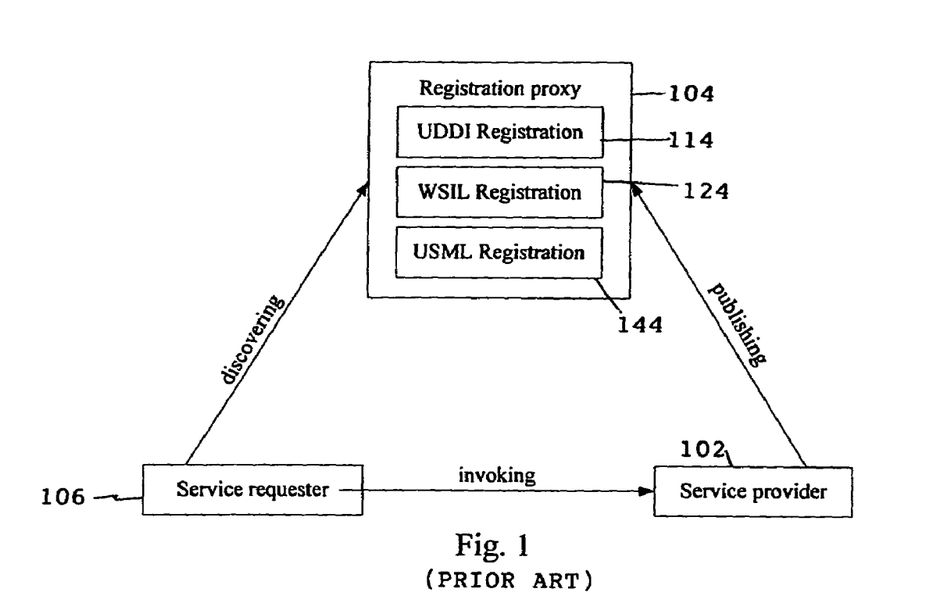
FIG. 1 is a schematic diagram showing a prior Web service architecture.

Web services are on-line application programs developed and published over a network by service providers for meeting some business requirements. Once a Web service is published, other applications are able to access and use the service through the network. FIG. 1 is a schematic diagram showing Web service architecture in accordance with current technology. It can be seen from FIG. 1 that in the field of Web services, there are three kinds of components, that is, service providers 102, a registration proxy 104, and service requesters 106. The service providers develop Web services and describe the developed services to the registration proxy using a universal object description language, i.e. the Web Services Description Language (WSDL). This process is the Web service publishing process, wherein categories of registered Web service providers, interface features for accessing the Web services and various non-interface features, such as security requirements, transaction requirements and charge for using the Web services, are described with WSDL. It should be noted that the WSDL defines each Web service as a port and each port is used for representing a mapping from an abstract port type (i.e., portType) to a specific communication protocol for invoking a Web service.

A registration proxy 104 is used for providing a registration location for Web services. The registration proxy registers the Web services that have been published, categorizes these services based on the descriptions of the Web services, and provides discovery service. A registration proxy further includes a UDDI (Universal Description, Discovery and Integration) registration center 114, a WSIL (Web Service Inspection Language) registration center 124, a USML (UDDI Search Markup Language) registration center 144, and others, depending on the registration mechanisms.

A Web service requester requests interaction with a Web service through a SOAP (Simple Object Access Protocol) message, so as to invoke the service. Usually, before this invocation happens, it is necessary to discover a Web service that meets specific functional or other requirements on the registration proxy and locate a proper Web service implementation previously unknown to the requester based on the descriptions of the Web services. This process is performed by the service requester and the registration proxy. Because the discovery at the registration proxy and subsequent selection may result in a plurality of candidates, it may be necessary for the requester to make further selection among these candidates based on additional criteria, such as Quality of Service (QoS). In some cases, the selection process is still insufficient and it may be necessary to compare the actual invocation results of the remaining candidates to determine the best service implementation.

Since one Web service interface usually defines a plurality of correlative operations, sometimes it may be necessary to make a follow-up invocation on the same candidate that returned the best result as a further step of an online transaction process. For instance, the interface of an on-line bookstore Web service may consist of two on-line operations, that is, "queryBook" operation and "orderBook" operation, wherein the "queryBook" operation provides information about the names and prices of available books, while the "orderBook" operation implements the actual ordering transaction. In this case, a requester may invoke the "queryBook" operation of several candidate bookstore service implementations, compare the invocation results and select the Web service implementation that has the desired book while offering the lowest price. Then, the requester invokes the "orderBook" operation of the selected Web service implementation so as to complete the transaction process of book-ordering.

It can be seen that the whole process described above, consisting of service discovery, selection, invocation and result comparison as well as follow-up invocations, depends on the participation of the service requester. As a result, the invocations of these implementations are time consuming work for a requester, and lack reusability and adaptability.

U.S. Patent Publication No. 2004/0111525 proposed a mechanism for dynamic discovery and selection of Web service implementations at runtime without explicit requester control. Service requests are received from requesters and a portType, or other type identifier of operations that need to be supported by a Web service implementation, is identified. A discovery mechanism is invoked for querying service information sources to identify, from these sources, candidates that support the portType or operation identified. Then, a service object is generated using the selected Web service implementation candidates and a requester uses the service object to access actual service implementations. Although more reusability may be brought and the complexity of the discovery and selection process may be partly avoided by adopting the apparatus and method suggested by the proposed mechanism, the requester is only allowed to specify very limited discovery criteria (through service portType and operation name) and no selection criteria, which means that the selection process is completely controlled by the underlying mechanism. Further, the invention does not support invocation result comparison.

U.S. Patent Publication No. 2003/0204622 discloses another method for dynamically invoking a Web service. The method comprises assembling a collection of references to remote Web service implementations based on a common port type. A Web service implementation document for each referenced remote implementation in the collection is parsed to determine a list of ports through which the remote implementations can be invoked. Based on at least one of high-availability concerns, service quality concerns and economic concerns, a set of port selection rules is compiled and applied to the determined ports so as to select a specific one. Finally, a corresponding Web service may be invoked through the selected specific port. It can be seen that the disclosed method does not provide any way for the requester to explicitly specify its discovery and selection criteria when making a service invocation. And again, the method does not support invocation result comparison.

As a conclusion, the above-mentioned known solutions either let the requester handle all the complexity involved in the Web service discovery and selection process or take the process over wholly without allowing the requester any explicit control.

SUMMARY OF THE INVENTION

In order to solve above-mentioned problems, the present invention proposes a method, system and Web service broker with explicit requester control for dynamic Web service invocation, so that the requester may explicitly control the Web service invocation process through customized invocation criteria embedded in a Web service request, whereby the whole invocation process is performed by a Web service broker so as to reduce the complexity of the client task and improve the performance of the Web service invocation.

According to an aspect of the present invention, there is provided a method for dynamic Web service invocation, comprising the steps of constructing a Web service request by a Web service requester, in which invocation criteria customized by the requester are included; sending the Web service request to a Web service broker; discovering and invoking Web service implementation candidates that meet the invocation criteria based on the Web service request, and returning the best invocation result as well as a session identifier for identifying this service request to the requester by the service broker.

The method for dynamic Web service invocation according to the present invention allows a series of invocations with a consistent business sense to the same Web service interface.

According to another aspect of the present invention, there is provided a Web service broker for implementing dynamic Web service invocations, comprising: a controller module for controlling the operations of the components in the service broker according to the customized invocation criteria contained in a Web service request from a Web service requester; a discovery module for discovering Web service implementation candidates that meet the invocation criteria from a source of Web service implementations; a selection module for further selecting Web service implementation candidates from the Web service implementation candidates discovered by the discovery module according to the invocation criteria; and an invocation and comparison module for invoking each of the Web service implementation candidates and comparing invocation results returned by the Web service implementation candidates according to the invocation criteria, so as to select the best Web service implementation.

From above it can be seen that the present invention has the following advantages:

1. Dramatic reduction of Web service client development work. With the invention, a client can delegate the whole process of dynamic Web service invocation, including service discovery, selection, invocation and result comparison, to a Web service broker, and the client can get a best invocation result returned from the service broker, which has been selected by comparison of invocation results, via a single call similar to a direct call to the ultimate Web service implementation.

2. Explicit client-side control. With the invention, a Web service requester has explicit control of the whole process. The invention allows a Web service requester to customize different Web service invocation criteria according to his own preferences, providing convenience for the requester to change Web service invocation criteria so as to adapt to the business requirements.

3. Flexible architecture. The invention may be implemented as a Web service broker at a middleware layer between service requesters and service implementations, or as a Web service broker component at the client side, providing better reusability and flexibility for the Web service invocation.

BRIEF DESCRIPTION OF THE DRAWINGS

It is believed that above-mentioned and other objects, features and advantages of the present invention will be more clearly understood from the following detailed description of embodiments of the present invention with reference to the drawings, in which.

DETAILED DESCRIPTION OF THE INVENTION

Next, preferred embodiments of the present invention will be described in detail with reference to the drawings.

Figure 2:
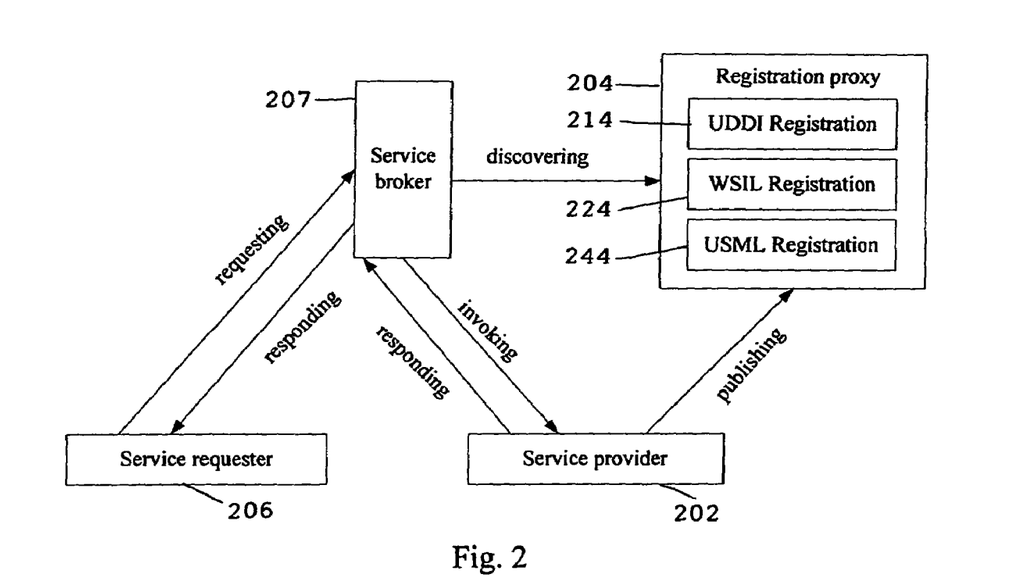
FIG. 2 shows a dynamic Web service invocation system according to a preferred embodiment of the present invention.

FIG. 2 shows a dynamic Web service invocation system according to a preferred embodiment of the present invention. As shown in FIG. 2, in a Web service invocation process according to the present invention, instead of directly sending a Web service discovery request to a service registry and a subsequent invocation request to the discovered service implementations, the requester 206 sends his customized service request to a service broker 207 that may be implemented as a middleware between the Web service requester and Web service implementations or as a Web service broker component at the client-side. The service broker 207, according to Web service invocation criteria customized by the Web service requester, discovers and invokes Web service implementation candidates, such as service provider 202, that meet the Web service invocation criteria, and returns to the requester a best invocation result and a session ID that is used to identify this service request as a response to the Web service request. The present invention allows Web service requesters to customize their invocation criteria that will be used by a service broker between the service requester and a source of Web service implementations to reduce the number of returned Web service implementation candidates and invocation results. With the present invention, the complexity of the client-side tasks is reduced through delegating those operations related to the Web service invocation, such as discovery, selection and invocation result comparison, to a service broker for execution. At the same time, a user at client-side may realize explicit control of the whole Web service invocation through his customized service requests.

The present invention allows Web service requesters to customize their own Web service invocation criteria in a Web service request based on their business requirements and preferences, so as to filter discovered Web service implementation candidates and invocation results. These invocation criteria should be expressed in a language that is understandable to both the requester and the service broker. In a preferred embodiment of the present invention, a schema named as Web Services Hyper Search Language (WSHSL) is provided. The schema defines a request message format and a response message format in XML, wherein the WSHSL request is used in a Web service request to express the requester's various customized criteria. The WSHSL response is used in a Web service response to carry a session ID that identifies a service request.

In the embodiment, a WSHSL request defines user customized invocation criteria in the form of rules. A WSHSL request consists of three parts: a discovery part, a selection part and an invocation result comparison part. Each of the three parts defines one or more rules. It is through these rules customized by the Web service requester that the present invention implements the requester's explicit control of the whole Web service invocation process.

The discovery part is used to guide the Web service discovery process in searching for a plurality of Web service implementation candidates that meet the discovery criteria specified by the service requester. In most instances, one discovery rule is sufficient. The discovery mechanism to be employed and related information are also specified in the discovery rule(s). Currently available discovery mechanisms include those shown at registration proxy 204, specifically UDDI (Universal Description, Discovery and Integration) at 214, WSIL (Web Services Inspection Language) at 224, USML (UDDI Search Markup Language) at 244, among others not specified.

The selection part is used to guide the selection process. It specifies what kind of information should be collected with regard to the discovered Web service implementation candidates and how this information should be compared to select the more preferred Web service implementation candidates. Typically, this information includes QoS (Quality of Services) information, supported locales, etc.

The invocation result comparison part is used to guide the invocation comparison process. It specifies how to extract data from the invocation results regarding the Web service implementation candidates and how to compare the data to identify the best invocation result, and further the best Web service implementation. The invocation result comparison rules are usually related to the form in which the invocation results are expressed. For instance, when the invocation results are expressed in XML, the invocation result comparison rules usually include value locators, comparison operators, and optional constant objects, wherein the value locators are used for locating certain kind of values to be compared in the XML data. Usually, Xpath expression may be used as a value locator. Comparison operators are used to define how to compare this kind of values extracted from each invocation result, usually to find the maximum or minimum value through comparison operations. Sometimes, however, it may be desired to compare the values to a constant, for instance, to determine if it is larger than a constant, earlier than a given time, and so on. Thus, the invocation result comparison rules sometimes contain optional constant objects. Since an Xpath expression may result in multiple values, it is often necessary to specify whether the comparison should be carried out in an "ALL" or "ANY" manner for a certain rule. "All" means an invocation result complies with the concerned rule only if all the located values comply with this rule, while "ANY" means an invocation result complies with the concerned rule if any of the values complies with this rule.

It should be noted that the above-mentioned discovery part is necessary in the initial invocation, while the selection part and invocation result comparison part are optional. That is, a Web service requester may choose whether to further filter the located Web service implementation candidates through these two parts. The requester may have only the selection part included in a customized WSHSL request (i.e., to further filter the Web service implementation candidates through a selection process), have only the invocation result comparison part included in the customized WSHSL request (i.e., to filter the Web service candidates through an invocation result comparison process), or have both parts included in the WSHSL request. In the follow-up invocations, however, the discovery part and the selection part are usually no longer needed; however, a session ID that identifies this service request must be provided and an optional invocation result comparison part may be included. The session ID is contained in a WSHSL response returned from the initial invocation.

Figure 3:
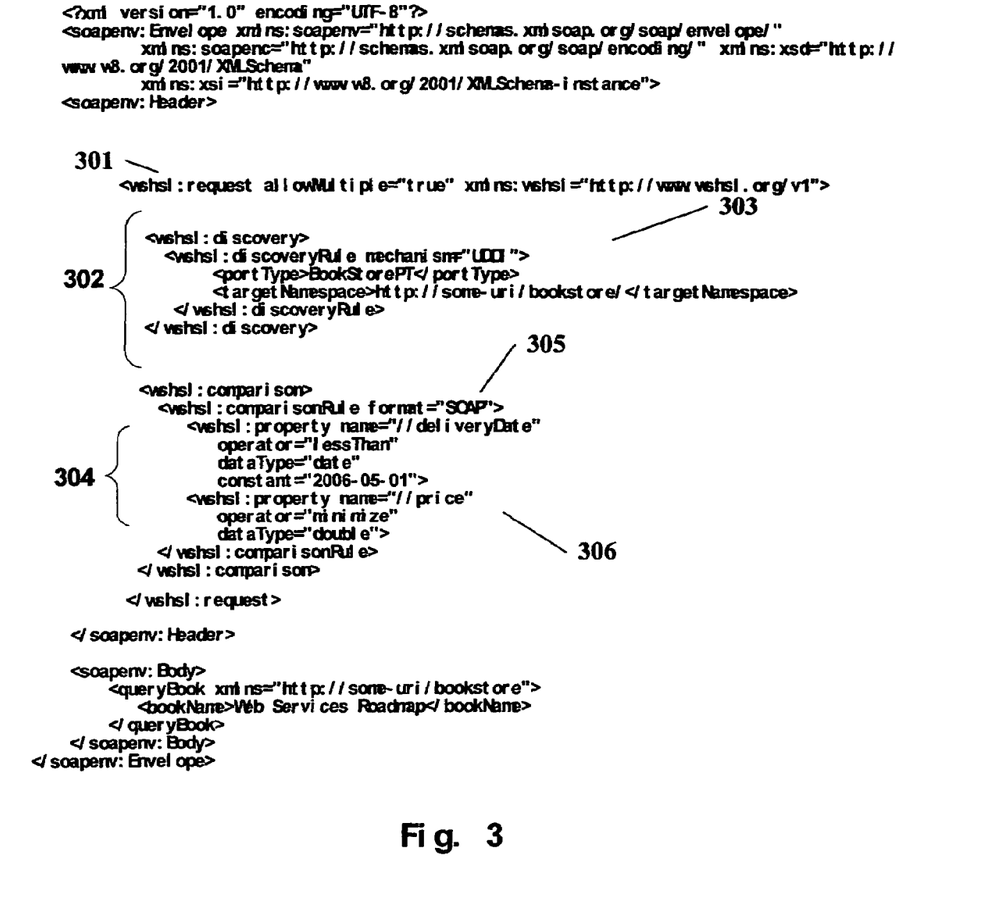
FIG. 3 is a schematic diagram showing an initial invocation request in a dynamic Web service invocation with explicit requester control according to a preferred embodiment of the present invention.

Now referring to FIG. 3, an example of a WSHSL request that is used for the initial invocation is shown. The request includes discovery part and invocation result comparison part, which is contained in a complete SOAP request message. As shown in FIG. 3, the request starts with a WSHSL request tag 301. In the request tag 301, there is an attribute "allowMultiple" for indicating whether to invoke a plurality of Web service implementation candidates, whose value is "true" in FIG. 3 indicating that a plurality of Web service implementation candidates may be invoked so as to compare their invocation results for further filtering. In addition, the accompanying discovery part 302 contains a discovery rule 303 that specifies UDDI as the discovery mechanism. The discovery rule 303 includes two searching conditions: portType and targetNamespace. The invocation result comparison part 304 contains an invocation result comparison rule 305 that specifies SOAP as the format of the invocation results and specifies selection of invocation results with "deliverydate" earlier than May 1, 2006 and the lowest "price".

Figure 4:
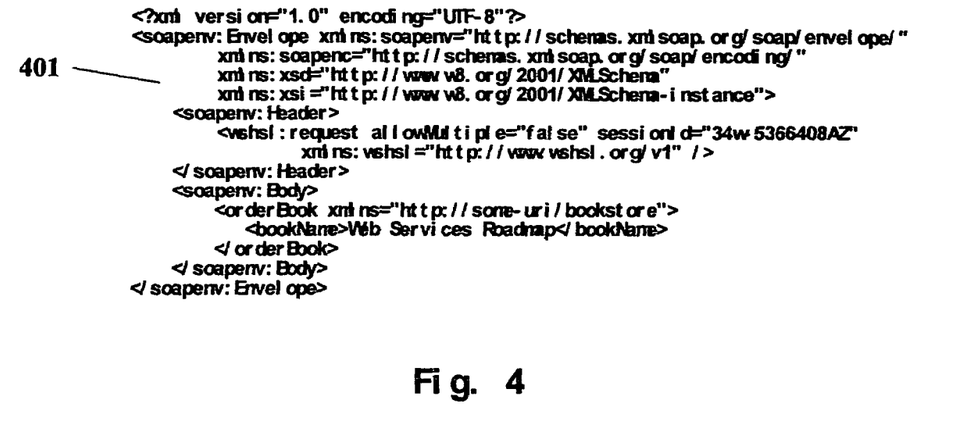
FIG. 4 is a schematic diagram showing a follow-up invocation request in a dynamic Web service invocation with explicit requester control according to another preferred embodiment of the present invention.

Now referring to FIG. 4, an example of a WSHSL request that is used for the follow-up invocations, which is also contained in a complete SOAP request message, is shown. As shown in FIG. 4, the request contains a WSHSL request 401 that has an attribute for indicating whether to invoke a plurality of Web service implementation candidates. The attribute value is "false" in FIG. 4 indicating only one Web service implementation candidate to be invoked. In the illustrated case, specification of any invocation result comparison rules would not be permitted since only one candidate will be invoked. The illustrated WSHSL request 401 also specifies the session ID of the service request as "34w-5366408AZ", which is obtained from the response to the request as shown in FIG. 3.

Further, how a WSHSL request (or a WSHSL response) can be embedded in a Web service request (or response) depends on the underlying binding protocol used by the requester, such as SOAP, HTTP-GET and so on. In one embodiment of the present invention SOAP protocol is used, so a WSHSL request or response can be embedded as a part of the SOAP message. Usually the header of the SOAP message will be extended to include the WSHSL request or response, as shown in FIG. 3 and FIG. 4. With the present invention, the service broker can interpret and fulfill WSHSL requests embedded in Web service requests.

Figure 5:
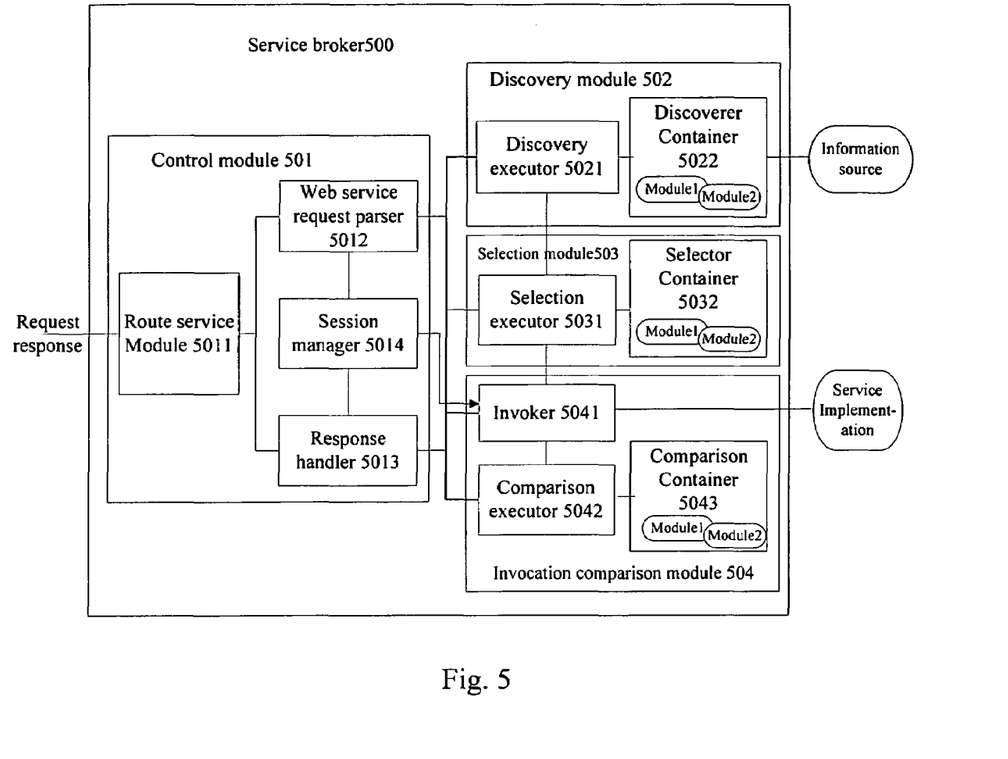
FIG. 5 is a block diagram of a service broker that implements dynamic Web service invocation according to a preferred embodiment of the present invention.

Next, a detailed description of the service broker that implements dynamic Web service invocation will be given in conjunction with the drawings. FIG. 5 is a block diagram of a service broker that implements dynamic Web service invocation according to a preferred embodiment of the present invention. As shown in FIG. 5, the service broker 500 of the present embodiment includes a control module 501, a discovery module 502, a selection module 503 and an invocation and comparison module 504.

Herein, the control module 501 is used to control various parts of the service broker to cooperate with each other, so as to obtain the best Web service implementation that meets the Web service invocation criteria customized by the user. The control module further includes a route service module 5011, a Web service request parser 5012, a response handler 5013 and a session manager 5014. The route service module 5011 is used to receive any incoming Web service request to the service broker and return the best Web service invocation result that meets the user-customized Web service invocation criteria and a session ID for identifying the service request to the requester. After receiving a Web service request, the route service module sends the request to the Web service request parser 5012. The parser 5012 validates the WSHSL request embedded in the Web service request and parses it. If it is an initial invocation (no session ID provided), the parser will extract various rules, including discovery, selection and invocation result comparison rules, from the WSHSL request and distribute these rules to the corresponding discovery module, selection module, and/or invocation and comparison module. Otherwise, if there is provided a session ID in the WSHSL request, indicating that this invocation is a follow-up invocation, the parser will forward the request to the session manager 5014. The session manager 5014 is responsible for maintaining session information, such as remaining Web service implementation candidates after filtering in the previous invocation. The session information maintains a correspondence relation between a session identifier for identifying a service request and the service implementation candidates located during the session indicated by the session identifier. The response handler 5013 is used to construct a response to be returned to the requester based on the processing results of the modules, such as a "positive" response message composed of the "best" invocation result, the session ID used for identifying this service request and WSHSL response, or a "negative" response message reporting an error. At the same time, the response handler 5013 reports the related information of this invocation (on whether the invocation is successful, remaining Web service implementation candidates, etc.) to the session manager.

The discovery module 502 is used to search for Web service implementation candidates that meet the criteria from a source of Web service implementations based on the extracted discovery rules. Generally, the discovery module will compile a list of qualified Web service implementation candidates as its output, and may save the output of frequently used discovery rules in a database or cache to improve discovery performance. The discovery module further includes a discovery executor 5021 and a discoverer container 5022.

The discovery executor 5021 is used to parse the discovery rules, and invoke a corresponding discoverer module among the multiple discoverer modules in the discoverer container 5022 to enforce the rule based on the discovery mechanism specified in the discovery rule. It should be noted that more than one discovery rule might be included in the WSHSL request, thus for each discovery rule the discovery executor needs to interact with the discoverer container in order to identify a discoverer module that implements the discovery mechanism specified by the discovery rule, and to submit the rule to the discoverer module for enforcing. After this, according to the enforcing results of the corresponding discovery rules by each discoverer module, a list of Web service implementation candidates that meet the criteria of the discovery part is finally generated.

The discoverer container 5022 contains a plurality of discoverer modules, each of which implements a discovery mechanism for discovering Web service implementation candidates that match the discovery rules from a source of Web service implementations and returns the candidates to the discovery executor 5021.

In the case that the discovery module 502 does not find a qualified Web service implementation candidate that meets the discovery rules in the WSHSL request from the source of Web service implementations, the response handler 5013 will be informed to construct a "error or negative" response message and send the message to the requester through the route service module 5011.

Based on the extracted selection rules, the selection module 503 further selects Web service implementation candidates that meet the criteria from the Web service implementation candidates discovered by the discovery module 502, and passes the remaining candidates to the invocation and comparison module 504. The selection module 503 further includes a selection executor 5031 and a selector container 5032.

The selection executor 5031 is used to parse the selection rule and invoke corresponding selector modules in the selector container 5032 to enforce the rules. It should be noted that more than one selection rule might be included in the WSHSL request, such that for each selection rule the selection executor needs to interact with the selector container 5032 in order to identify a corresponding selector module and to submit the selection rule to the selector module for enforcing. After this, according to the enforcing results of the corresponding selection rules by each selector module, a list of Web service implementation candidates that meet the criteria of the selection part is finally generated.

The selector container 5032 contains a plurality of selector modules, each of which is used to select Web service implementation candidates that match the selection rules from the Web service implementation candidates discovered by the discover module and to return the candidates to the selection executor 5031.

In the case that the selection module 503 does not find any qualified Web service implementation candidate, the response handler 5013 will be informed to construct an "error or negative" response message and send the message to the requester through the route service module 5011.

The invocation and comparison module 504 is used to invoke the Web service implementation candidates discovered by the discovery module, selected by the selection module or provided by the session manager, and to compare the invocation results returned by these Web service implementation candidates based on the invocation result comparison rules, so as to select the best Web service implementation. The invocation and comparison module further includes an invoker 5041, a comparison executor 5042 and a comparator container 5043.

The invoker 5041 invokes remaining Web service implementation candidates using the initial Web service request with the embedded WSHSL request removed. When the attribute "allowMultiple" in the WSHSL request is "false", only one Web service implementation candidate (for example, a randomly selected one) will be invoked by the invoker; otherwise, when the attribute is "true", each of the service implementation candidates will be invoked by the invoker. The invoker is a Web service client-side component.

The comparison executor 5042 is used to parse the invocation result comparison rules and invoke corresponding comparators in the comparator container 5043 to enforce the rules. It should be noted that more than one invocation result comparison rule might be included in the WSHSL request; thus, for each rule, the comparison executor needs to interact with the comparator container 5043 in order to identify a corresponding comparator module and to submit the invocation result comparison rule to the comparator module for enforcing. After this, according to the enforcing results of the corresponding invocation result comparison rules by each comparator module, the best Web service implementation that meets the criteria of the invocation comparison part is finally selected and the invocation result of the best Web service implementation and related information are sent to the response handler 5013 so as to construct a "positive" response message and return the message to the requester.

The comparator container 5043 contains a plurality of comparator modules, each of which is used to compare the invocation results of the Web service implementation candidates returned from the invoker 5041, to select the best Web service implementation that meets the invocation result comparison rules, and to return the best Web service implementation to the comparison executor 5042.

In the case that the invocation and comparison module 504 does not find any qualified best Web service implementation, the response handler 5013 will be informed to construct an "error or negative" response message and send the message to the requester through the route service module 5011.

The discoverer container, selector container and comparator container in the present embodiment manage discoverer modules, selector modules and comparator modules, respectively. These modules are pluggable, making the service broker quite flexible and extensible. For instance, the discoverer container may manage several modules, one of which supports a UDDI discovery mechanism, another of which supports a WSIL discovery mechanism, and the third of which supports a USML discovery mechanism, and more such modules as may be added. In the same way, the selector container may have a plurality of modules plugged therein for processing various WSHSL selection rules or other Web service description languages, respectively. Similarly, the comparator container may have modules plugged therein.

Above, the dynamic Web service invocation system and the service broker for implementing the dynamic Web service invocation according to the preferred embodiments of the present invention have been described in details in conjunction with the drawings.

Under the same concept of the invention, according to another aspect of the present invention, there is provided a method for dynamic Web service invocation. Hereafter, the method will be described in detail in conjunction with the drawings.

Figure 6:
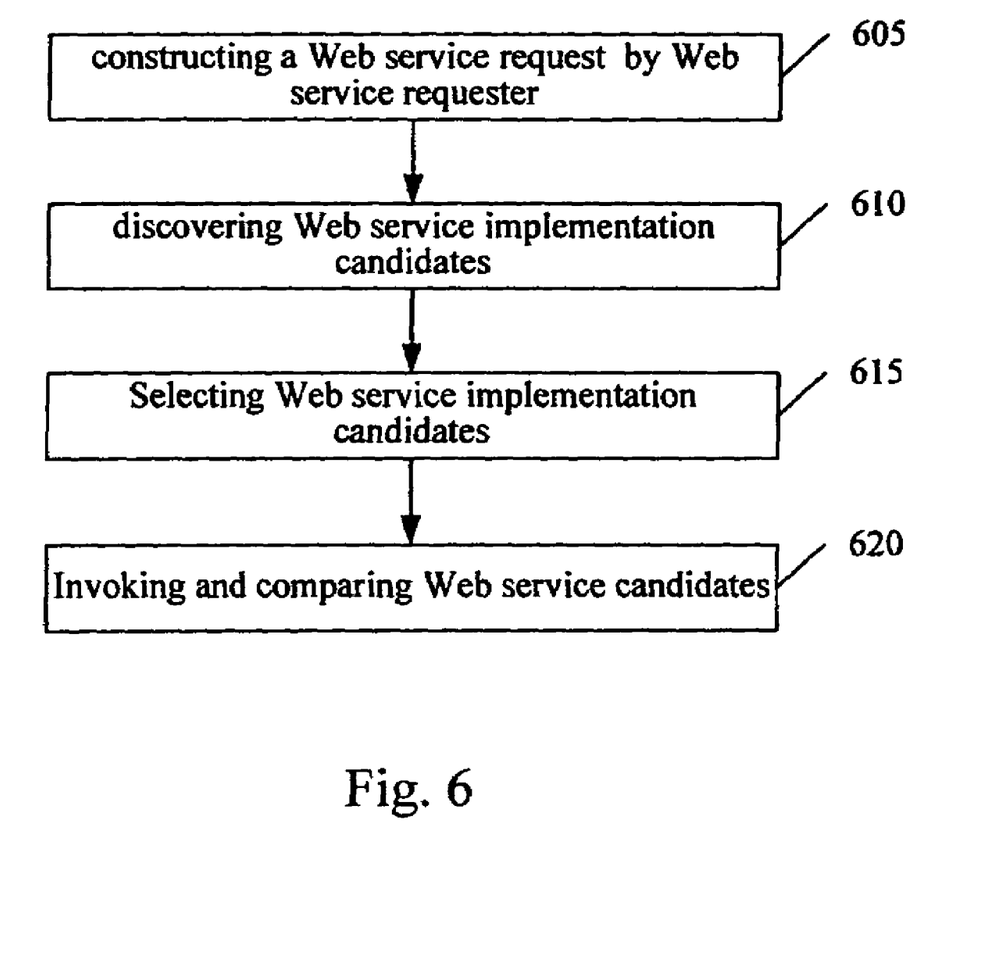
FIG. 6 is a general flowchart of the initial invocation in a method for dynamic Web service invocation with explicit requester control.

FIG. 6 is a flowchart showing the initial invocation in the method for dynamic Web service invocation according to an embodiment of the present invention. In this embodiment, based on the Web service invocation criteria customized by the Web service requester, the above-mentioned service broker for implementing dynamic Web service invocation will return the best Web service invocation result, which is obtained through the discovery, selection and invocation, and comparison processes, with the session ID to the requester.

As shown in FIG. 6, in accordance with the method, the Web service requester constructs a Web service request at Step 605. As mentioned before, the present invention allows the service requester to customize his own invocation criteria, and the service broker will, based on these invocation criteria, return the best Web service implementation, which is obtained through the discovery, selection and invocation, and comparison processes, to the requester. In the present embodiment, the service requester embeds the customized invocation criteria into a Web service request and sends the request to the service broker. Herein, the schema adopted by the invocation criteria is the above-mentioned WSHSL schema, which will not be described again.

After the Web service requester has constructed a Web service request in which the above-mentioned WSHSL request is included and has sent it to the service broker, the service broker needs to, for the requests, perform the processes of discovery 610, selection 615 and invocation and comparison 620 on the Web service implementation candidates to obtain the best Web service implementation. It should be noted that the service broker performs these processes automatically.

Figure 7:
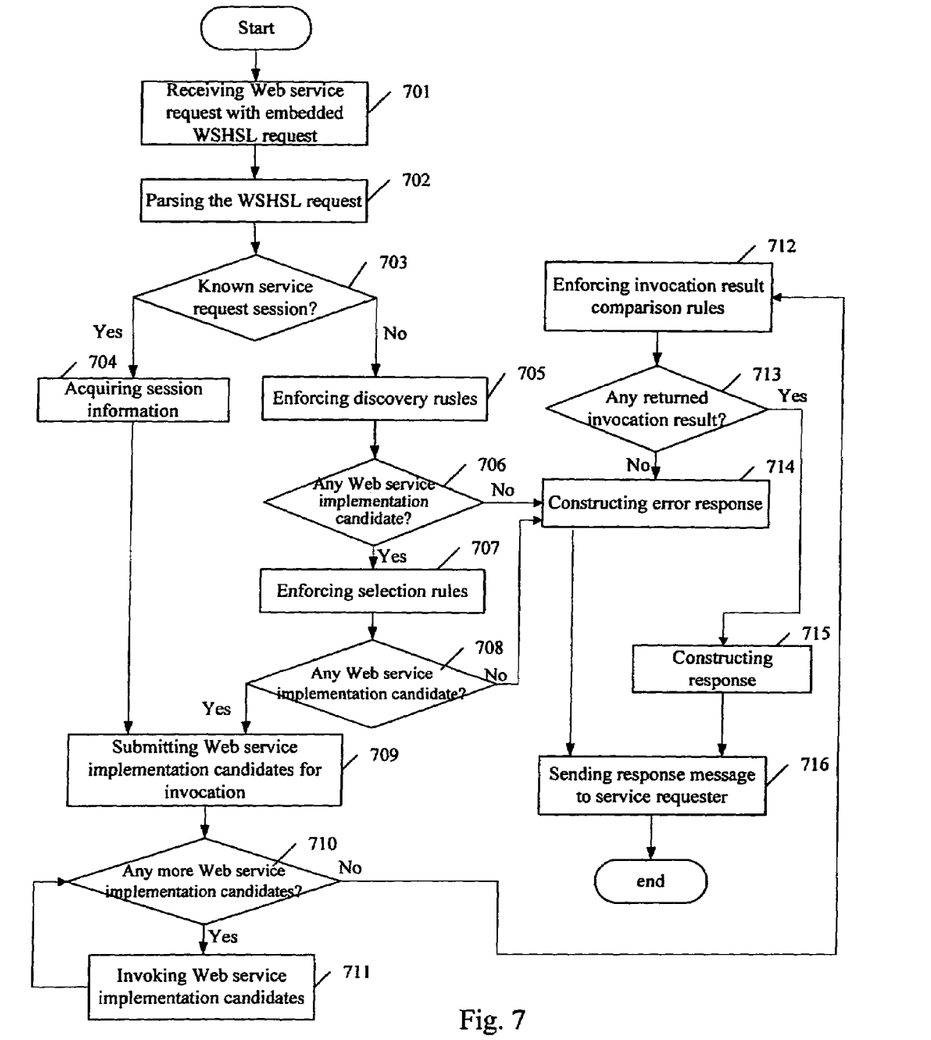
FIG. 7 is a flowchart of a method for dynamic Web service invocation according to a preferred embodiment of the present invention.

FIG. 7 shows the details of the steps performed after the service broker receives a Web service request in which a WSHSL request is embedded (an initial invocation or follow-up invocation). These steps are performed by the system.

As shown in FIG. 7, the process begins at Step 701 when the service broker receives a Web service request in which a WSHSL request is embedded. Then at Step 702, the service broker parses the WSHSL request. At this Step, according to the WSHSL schema previously defined, the service broker extracts the available session ID and rules, including discovery, selection, and invocation result comparison rules, from the WSHSL request.

At Step 703, a decision is made to determine whether there is a valid session ID contained in the WSHSL request. If there is, indicating that this request is a follow-up invocation, then the process proceeds to Step 704. At Step 704, the session manager will read the required session information based on the session ID and will directly forward the information to the invocation and comparison module for the subsequent step 709. Otherwise, if the WSHSL request does not provide a valid session ID, indicating that this request is the first invocation, the process proceeds to Step 705.

At Step 705, the service broker enforces the extracted discovery rules to discover Web service implementation candidates that match the discovery rules. At this step, the service broker uses the discovery mechanism specified in the discovery rules to discover the Web service implementation candidates that match the discovery rules from a source of Web service implementations, wherein the discovery mechanism specified in the discovery rules may be currently available UDDI (Universal Description, Discovery and Integration), WSIL (Web Services Inspection Language), USML (UDDI Search Markup Language) or other discovery mechanism. The discovery process will return a group of Web service implementation candidates that match the discovery rules, if any.

At Step 706, the service broker makes a decision to determine whether any such qualified Web service implementation candidates have been found in the previously discovery step. If there is a Web service implementation candidate, the following step 707 will be performed; if there is no such a Web service implementation candidate, the process will proceed to Step 714.

At Step 707, the service broker enforces the selection rules extracted from the above-mentioned WSHSL request. At this step, the service broker further filters the Web service implementation candidates obtained in the discovery step 705 based on the selection rules. It should be noted that more than one selection rule may be included in the selection part of the WSHSL request. With more than one selection rule, the service broker should enforce each selection rule respectively, that is, each selection rule should be utilized to filter the Web service implementation candidates returned from the discovery step 705 respectively and the enforcing results of the various selection rules will be combined according to certain conditions. In addition, the information used in the selection process may come from the discovery process or from any other available information source. Finally, the selection process will return a group of Web service implementation candidates that meet the criteria of the selection part, if there are any such Web service implementation candidates.

At Step 708, the service broker makes a decision to determine whether there is any Web service implementation candidate, if there is, the next step 709 will be performed, otherwise the process proceeds to Step 714.

At Step 709, if the value of attribute "allowMultiple" of the WSHSL request is "false", an arbitrary one of the current Web service implementation candidates is submitted for invocation, otherwise all of the Web service implementation candidates are submitted for invocation.

At Steps 710 and 711, the service broker invokes each of the submitted Web service implementation candidates sequentially. At these steps, the service broker sends the initial Web service request with the WSHSL request part removed to each of the remaining Web service implementation candidates for invoking.

After the process returns back from all of the invocations of the remaining Web service implementation candidates, at Step 712, the service broker enforces invocation result comparison rules extracted from above-mentioned WSHSL request. At this step, the service broker compares the invocation results returned from the remaining Web service implementation candidates based on the invocation result comparison rules, so as to select the best Web service implementation. It should be noted that more than one invocation result comparison rule may be included in the invocation result comparison part of the WSHSL request. With multiple invocation result comparison rules, the service broker should enforce each invocation result comparison rule respectively, that is, each invocation result comparison rule should be utilized to compare the invocation results of the current Web service implementation candidates respectively and the enforcing results of the various rules will be combined according to certain conditions so as to select the best Web service implementation. Finally, the process of invocation result comparison will return the best Web service implementation that meets the criteria of the invocation result comparison part and its invocation result, if there is such a Web service implementation. All of the information is ideally saved in the session information.

At Step 713, the service broker makes a decision to determine whether a best Web service implementation has been obtained after invocation comparison. If a best candidate exists, the Step 715 will be performed; otherwise the Step 714 is performed.

At Step 715, the service broker constructs a response message, in which the invocation result of the best Web service implementation and the session ID of this service request are included. The session ID will be newly created in the case of an initial service request. If no best Web service implementation has been found, the service broker constructs an error response message at Step 714. At Step 716, the service broker sends the constructed response message to the Web service requester.

Above, the system, method for dynamic Web service invocation and the service broker for implementing the dynamic Web service invocation according to the preferred embodiments of the present invention have been described in details in conjunction with the drawings.

It should be noted that in the present invention, when a plurality of rules are included in the discovery, selection or invocation result comparison rules, the service broker may enforce these rules sequentially according to a priority order set by the requester. Further, when there is a plurality of Web service implementation candidates, each of the Web service implementation candidates may be invoked in parallel.

In addition, it should be further noted that, although service discovery process, service selection process and invocation and result comparison process are included in the present embodiment for obtaining Web service implementation candidates, it is not necessary that all processes be included. In a specific implementation of the present invention, it is possible to include only the service discovery process, or any other means that can obtain related Web service implementation candidates, and thus be within the scope of the present invention.

Above, the method for the dynamic Web service invocation and the service broker for implementing the method have been described in conjunction with the embodiments of the present invention. It should be noted that these embodiments are exemplary and those skilled in the art may make various changes on the basis of them without departing from the spirit and scope of the invention as set forth in the appended claims.

It should be noted that the method of the present invention may be embedded in a program product, which includes all features for implementing the method of the present invention and can implement the method when it is loaded in a machine system.

The invention claimed is:

1. A system for implementing dynamic Web service invocations, the system having a processor and a memory coupled to the processor, the system comprising:

a control module, stored in memory and executed by a processor, for controlling operations of components in a service broker according to customized invocation criteria contained in a Web service request received at said service broker from a Web service requester, said invocation criteria comprising one or more service discovery rules, one or more service selection rules, and one or more invocation result comparison rules, said control module comprising:

a route service module for receiving a Web service request from a Web service requester and returning response messages of the service broker to the requester;

a Web service request parser for parsing the Web service request from the route service module and extracting various rules for the discovery module, selection module or invocation and comparison module, respectively;

a session manager for maintaining session information, wherein the session information contains correspondence relation between a session identifier for identifying a service request and the service implementation candidates obtained during the session indicated by the session identifier;

and a response handler for constructing a service response message based on the processing results by said discovery module, selection module or invocation and comparison module and sending the message to the requester through said route service module;

a discovery module for discovering Web service implementation candidates that meet said invocation criteria from a source of Web service implementations, said discovery module comprising:

a discovery executor for parsing said one or more service discovery rules, and for each service discovery rule invoking a corresponding discoverer module in a discoverer container for enforcing the rules, and obtaining Web service implementation candidates that meet said invocation criteria based on the results of enforcing the various service discovery rules;

and a discoverer container that contains one or more discoverer modules, each of which implements a discovery mechanism for discovering Web service implementation candidates that match the service discovery rule, wherein said discovery mechanism is one of UDDI, WSIL and USML;

a selection module for further selecting Web service implementation candidates that meet said invocation criteria from the Web service implementation candidates discovered by said discovery module according to said invocation criteria, said selection module comprising:

a selection executor for parsing said one or more service selection rules, and for each service selection rule invoking a corresponding selector module in a selector container for enforcing the rules, and selecting Web service implementation candidates that meet said invocation criteria based on results of enforcing the various service selection rules;

and a selector container that contains one or more selector modules, each of which is used to select selected Web service implementation candidates that match a service selection rule from discovered Web service implementation candidates discovered by the discovery module;

and an invocation and comparison module for invoking each one of said Web service implementation candidates and comparing invocation results returned by the Web service implementation candidates according to said invocation criteria, so as to select the best Web service implementations, wherein said invocation and comparison module further comprises:

an invoker that invokes each of said Web service implementation candidates;

a comparison executor for parsing said one or more invocation result comparison rules, and for each invocation result comparison rule invoking a corresponding comparator module in comparator container for enforcing the rule, and obtaining the best Web service implementations that meet said invocation criteria based on the enforcing results of the various invocation result comparison rules;

and a comparator container that contains one or more comparator modules, each of which is used to compare invocation results of various Web service implementation candidates returned from said invoker and select the best Web service implementations that match the invocation result comparison rule.

2. The system as claimed in claim 1 wherein said invoker invokes each of said Web service implementation candidates in parallel.

3. The system as claimed in claim 1 wherein said invocation results are expressed in Extensible Markup Language, said invocation result comparison rules include: value locators, comparison operators and optional constant objects.

* * * * *